(12) United States Patent
Moriya et al.

(10) Patent No.: US 7,432,484 B2
(45) Date of Patent: Oct. 7, 2008

(54) CURRENT CONTROL FOR HIGH-FREQUENCY HEATING APPARATUS

(75) Inventors: Hideaki Moriya, Nara (JP); Haruo Suenaga, Osaka (JP); Shinichi Sakai, Nara (JP); Nobuo Shirokawa, Nara (JP); Manabu Kinoshita, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/577,344

(22) PCT Filed: Oct. 17, 2005

(86) PCT No.: PCT/JP2005/019047

§ 371 (c)(1),
(2), (4) Date: Apr. 16, 2007

(87) PCT Pub. No.: WO2006/043513

PCT Pub. Date: Apr. 27, 2006

(65) Prior Publication Data

US 2008/0061055 A1 Mar. 13, 2008

(30) Foreign Application Priority Data

Oct. 19, 2004 (JP) .............................. 2004-304095

(51) Int. Cl.
*H05B 6/68* (2006.01)

(52) U.S. Cl. ........................ 219/716; 219/721; 219/761; 315/39.51; 331/185

(58) Field of Classification Search ......... 219/715–721, 219/761; 315/39.51–39.57; 331/185–186

See application file for complete search history.

(56) References Cited

U.S. PATENT DOCUMENTS

| 6,215,112 B1 * | 4/2001 | Kim et al. ................ 219/704 |
| 2004/0074900 A1 * | 4/2004 | Suenaga et al. ........... 219/600 |

FOREIGN PATENT DOCUMENTS

| JP | 3-57194 | * 3/1991 | ................ 219/716 |
| JP | 2000-058252 | 2/2000 | |
| JP | 2004-006384 | 1/2004 | |

* cited by examiner

Primary Examiner—Philip H Leung
(74) Attorney, Agent, or Firm—Pearne & Gordon LLP

(57) ABSTRACT

The invention relates to a high frequency heating apparatus and provides a tracking method of a frequency modulation in order to prevent an extension of the harmonic current component of an oscillation threshold ebm which varies from moment to moment in accordance with a change in the temperature of a magnetron. A driving signal for driving a first semiconductor switching element (3) and a second semiconductor switching element (4) is transmitted to a driving control IC unit (14), and an input reference signal Ref is used to perform an input current fixed control. In this case, a variation amount of the input current of the input reference signal Ref is understood as an accumulation information POW and a constant is optimally configured in a resistor network in an ebm-tracking bias circuit (20).

4 Claims, 8 Drawing Sheets

CURRENT CONTROL FOR HIGH-FREQUENCY HEATING APPARATUS

TECHNICAL FIELD

The present invention relates to a control for suppressing generation of harmonic current components in a field of a high frequency heating apparatus such as a microwave oven which performs a dielectric heating process by driving a magnetron.

BACKGROUND ART

A power supply used in cooking appliances based on high-frequency heating such as a microwave oven used at home has been required to be small in size and light in weight owing to the nature of the cooking appliances. It is desirable that the space for accommodating the power supply is small in order to easily carry it and enlarge a cooking space in the kitchen. For this reason, the microwave oven is becoming smaller and lighter and being manufactured at low cost with employing a switching power supply. As a result, the power supply outputs a current waveform containing lots of harmonic components which are generated by a switching operation of the power supply. In addition, the microwave oven consumes as much as 2000 watts for the sake of shortening the cooking time. As a result, an absolute value of the current is also increased, and it makes difficult to meet a harmonics performance of the power supply. In light of this problem, a control method (improvement measure) for preventing generation of the harmonic current components has been proposed (for example, see Patent Document 1).

FIG. 9 shows one exemplary diagram of a magnetron-driving power supply for a high frequency heating apparatus (inverter power supply). The magnetron-driving power supply is constituted by a direct-current (DC) power supply 1, a leakage transformer 2, a first semiconductor switching element 3, a first capacitor 5 (snubber capacitor), a second capacitor 6 (resonant capacitor), a third capacitor 7 (smoothing capacitor) a second semiconductor switching element 4, a driving unit 13, a full-wave voltage doubler rectification circuit 11, and a magnetron 12.

The DC power supply 1 applies a DC voltage VDC to a serially connected circuit including the second capacitor 6 and a first coil winding 8 of the leakage transformer 2 by performing a full-wave rectification of a commercial power supply. The first semiconductor switching element 3 and the second semiconductor switching element 4 are connected to each other in series and the serially connected circuit including the second capacitor 6 and the first coil winding 8 of the leakage transformer 2 is connected in parallel to the second semiconductor switching element 4.

The first capacitor 5 is connected in parallel to the second semiconductor switching element 4 and serves as the snubber that prevents a surging current (voltage) during a switching process. The high AC voltage output generated in a second coil winding 9 of the leakage transformer 2 is transformed into a high DC voltage in the full-wave voltage doubler rectification circuit 11, and then applied between the anode and cathode of the magnetron 12. A third coil winding 10 of the leakage transformer 2 supplies current to the cathode of the magnetron 12.

The first semiconductor switching element 3 and the second semiconductor switching element 4 are each constituted by an IGBT and a flywheel diode connected in parallel to the IGBT. As a matter of course, the first and second semiconductor switching elements 3 and 4 are not limited to such a kind, but a thyristor, a GTP switching device, and the like can be also used.

The driving unit 13 has an oscillation unit therein for generating driving signals for driving the first semiconductor switching element 3 and the second semiconductor switching element 4. The oscillation unit generates a square wave with a predetermined frequency and transmits the driving signals to the first semiconductor switching element 3 and the second semiconductor switching element 4. Immediately after any one of the first semiconductor switching element 3 and the second semiconductor switching element 4 is turned off, voltage across the both ends of the other semiconductor switching element is high. Consequently, when any one thereof is turned off, a spike-like surge current is produced and thus unnecessary loss and noise are generated. However, by providing a dead time, the turn-off can be delayed until the voltage across the both ends becomes 0 V. Consequently, the unnecessary loss and the noise can be suppressed. As a matter of course, the same operation is similarly applicable to the case of a reverse switching process.

The detailed description of each operation mode of the driving signals generated by the driving unit 13 will be omitted (see Patent Document 2). However, the characteristics of the circuit configuration shown in FIG. 9 is that the voltage produced by the first semiconductor switching element 3 and the second semiconductor switching element 4 is equal to the DC power supply voltage VDC, that is, $240\sqrt{2}=339$ V, even in Europe where the highest voltage 240 V is used at general home. Consequently, even though an emergency situation such as lightning surge or abrupt voltage drop is taken into consideration, the first semiconductor switching element 3 and the second semiconductor switching element 4 can be used as a device which has a resistance to a 600 V or so (for example, see Patent Document 2).

Next, FIG. 10 shows a resonant property of this kind in an inverter power supply circuit (where an inductance L and a capacitor C constitute the resonant circuit). FIG. 10 is a diagram illustrating a property of current and a working frequency at the time of applying a predetermined voltage to the inverter resonant circuit, and a frequency f0 is a resonant frequency. During the practical inverter operation, a curved line property I1 (solid line) of the current and frequency is used in the frequency range from f1 to f2 which is higher than the frequency f0.

That is, when the resonant frequency is f0, the current I1 has the maximum, and the current I1 reduces as the frequency range increases from F1 to F3. That is because current which flows in the second coil winding of the leakage transformer increases since the current I1 approaches the resonant frequency at the time when the current I1 approaches the low frequency in the frequency range from f1 to f3. Conversely, since the current I1 becomes more distant from the resonant frequency at the time when the current I1 approaches the high frequency, the current of the second coil winding of the leakage transformer decreases. The inverter power supply for driving the magnetron which is a nonlinear load obtains a desired output by varying the frequency. For example, it is possible to obtain a continuous output, which is not impossible to obtain in an LC power supply, in the vicinity of f3, f2, and f1 in the case of the power output of 200 W, 600 W, and 1200 W, respectively.

In addition, the alternating current commercial power supply is used. Accordingly, when high voltage is not applied to the vicinity of power supply phases 0° and 180°, the inverter operating frequency is configured to the vicinity of f1, where resonant current increases, in the phases depending on a magnetron property in which a high frequency is not oscillated. In this manner, it is possible to increase a conduction angle in which electrical waves are transmitted by raising a boosting ratio of the applied voltage of the magnetron to the voltage of the commercial power supply. As a result, it is possible to embody a current waveform in which the fundamental wave components are numerous and the harmonics components is small, by changing the inverter operating frequency in every power supply phase.

Sequentially, FIG. 11 is a diagram illustrating a property of a change in a temperature of an applied voltage, that is, an oscillation threshold ebm required for the magnetron to irradiate a microwave. The horizontal axis represents anode current Ia that flows after the magnetron oscillates and the vertical axis represents the applied voltage between the anode and cathode of the magnetron. The magnetron is biased to the negative voltage. The applied voltage of about −4 KV is oscillated and the anode current starts to flow and the microwave is irradiated from an antenna. The oscillation threshold ebm of the magnetron is temperature-dependent and is likely to descend, as a temperature is higher.

That is because a magnet is used at the time of the spiral movement of electrons and the magnetism decreases due to the high temperature from 1900 K to 2100 K caused by electronic collision at the time of being oscillated in a cathode unit. To avoid the above phenomenon, it is necessary for the magnetron to be configured as a water-cooling type, such that the change in the temperature becomes very small. However, it is difficult for the general home microwave oven to be configured as the water-cooling type due to an installation condition and cost, and thus the most home microwave oven is configured as a forced air-cooling type. Accordingly, when the temperature increases in the successive movement manner, the oscillation threshold ebm decreases until −3 KV. The solid line shown in the drawing indicates the state of the room temperature and the dashed line indicates the property at the time of the increases in temperature. In this manner, the feedback control of tracking the change in the oscillation threshold ebm caused by the change in the magnetron is important. Above all, the harmonics performance of the power supply depends on how the shape of the frequency modulation waveform is well varied in the initial state of the room temperature, such that the harmonic component is prevented from occurring.

Patent Document 1: JP-A-2004-006384

Patent Document 2: JP-A-2000-058252

DISCLOSURE OF THE INVENTION

Problem that the Invention is to Solve

However, since harmonics of the power supply is measured several times in accordance with the regulation time in consideration of the actual use, it is necessary to come up with the solution that would resolve the change in the oscillation threshold ebm caused by the change in the temperature of the magnetron in the conventional configuration. However, when the good feedback control of tracking the change in the oscillation threshold ebm is not performed, the standard value can be deviated in the last time when the harmonics of the power supply is measured.

Means for Solving the Problem

In order to solve the above-described drawback, the invention has been made so as to provide a configuration capable of tracking the change in the oscillation threshold ebm in an easy and optimal manner by accumulating a variation amount of input current with respect to the change in the oscillation threshold ebm of the magnetron as an accumulation information, and changing the bias of frequency modulation waveform on the basis of the accumulation information.

According to the invention having the above-described configuration, the harmonic component can be prevented from being increased in the last time when the harmonic of the power supply is measured as well as allowing the input current to be uniform with respect to the change in the oscillation threshold ebm caused by the change in the temperature of the magnetron. In addition, the degree of margin for a standard value can be increased.

Advantage of the Invention

According to a high frequency heating apparatus of the invention, since a feedback control of performing frequency modulation control so as to optimally track the change in an oscillation threshold ebm caused by the change in the temperature of a magnetron, the degree of margin for a standard value can be increased while a harmonic component can be prevented. In addition, it is possible to perform an operation in a stable manner by providing an upper limit and a lower limit of a bias value even when voltage varies to the positive or negative with respect to the rating.

DESCRIPTION OF REFERENCE NUMERALS AND SIGNS

1: DC POWER SUPPLY
2: LEAKAGE TRANSFORMER
3: FIRST SEMICONDUCTOR SWITCHING ELEMENT

4: SECOND SEMICONDUCTOR SWITCHING ELEMENT
5: FIRST CAPACITOR
6: SECOND CAPACITOR
7: THIRD CAPACITOR
11: FULL-WAVE VOLTAGE DOUBLER rectification circuit
12: MAGNETRON
14: DRIVING CONTROL IC UNIT
15: FREQUENCY MODULATION-FORMING CIRCUIT
16: OSCILLATION CIRCUIT
17: DEAD TIME-FORMING CIRCUIT
18: SWITCHING ELEMENT-DRIVING CIRCUIT
19: INPUT FIXING CONTROL CIRCUIT
20: ebm-TRACKING BIAS CIRCUIT

BEST MODE FOR CARRYING OUT THE INVENTION

According to a first aspect of the invention, a high frequency heating apparatus drives a magnetron by allowing a semiconductor switching element to perform a high frequency switching operation using a commercial power supply, in which an input current fixing control with a decrease in an oscillation threshold ebm caused by a change in the temperature of the magnetron is performed by accumulating a variation amount of the input current as accumulation information and performing a feedback control on the basis of the accumulation information.

According to a second aspect of the invention, in the high frequency heating apparatus particularly according to the first aspect of the invention, the feedback control is performed by giving a bias to the input voltage information waveform which is a basis of the shape of a frequency modulation waveform.

According to a third aspect of the invention, in the high frequency heating apparatus particularly according to the second aspect of the invention, an upper limit is provided in the bias.

According to a fourth aspect of the invention, in the high frequency heating apparatus particularly according to the second aspect of the invention, a lower limit is provided in the bias.

According to a fifth aspect of the invention, in the high frequency heating apparatus particularly according to the second aspect of the invention, an upper limit and a lower limit are provided in the bias.

According to the above-mentioned configuration, even when the change in the oscillation threshold ebm caused by the change in the magnetron takes place, the stable current waveform, that is, the current waveform with the small harmonic component is maintained by tracking the change and performing a frequency modulation of an inverter operation. Consequently, it is possible to meet the standard at the time of measuring the harmonics of the power supply several times and to increase the degree of margin for a standard value.

Hereinafter, embodiments of the invention will be described with reference to drawings. The invention is not limited to the embodiments.

First Embodiment

Figure 1:
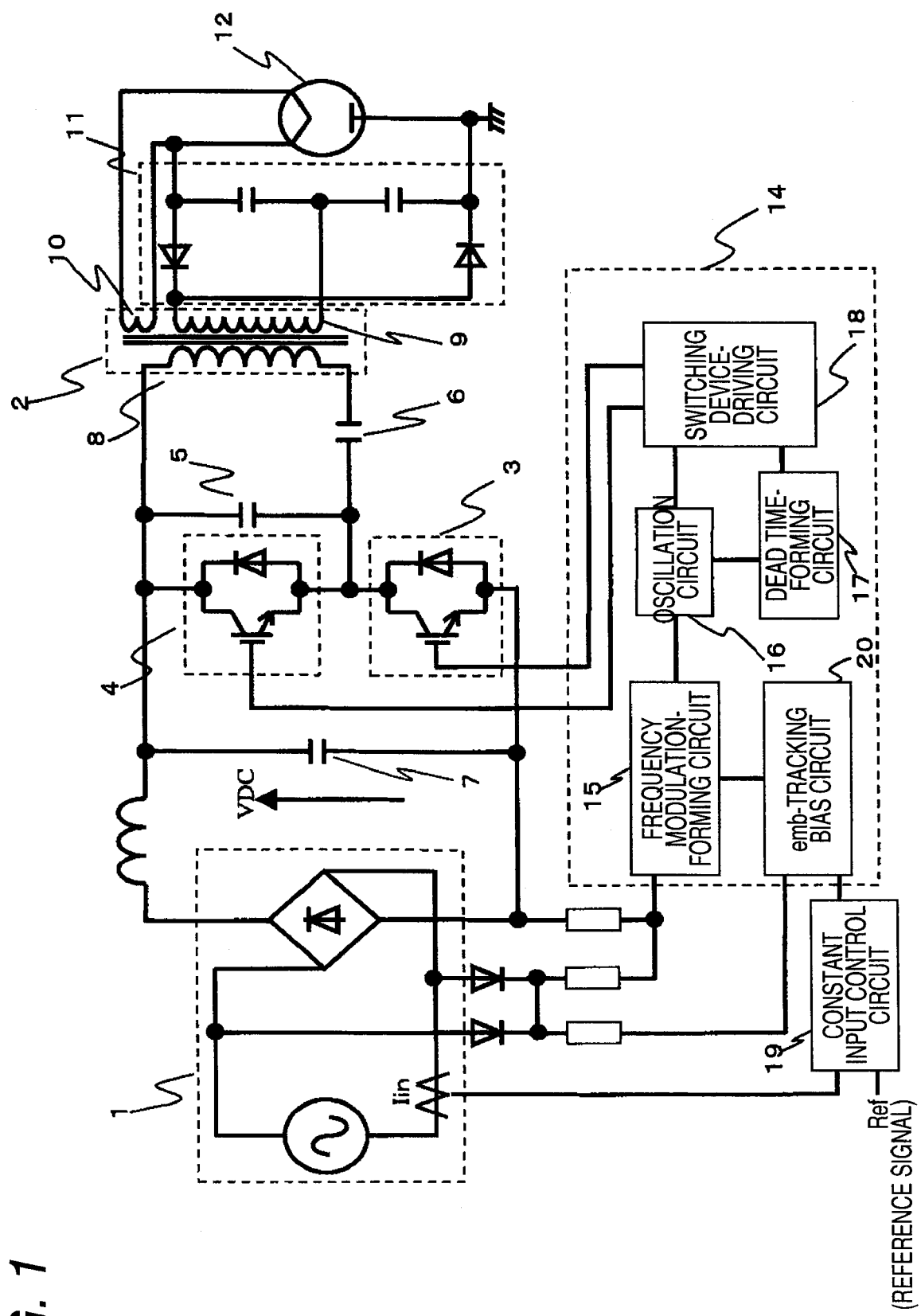
FIG. 1 is a diagram illustrating a circuit configuration of a high frequency heating apparatus according to first to fourth embodiments of the invention.
Figure 9:
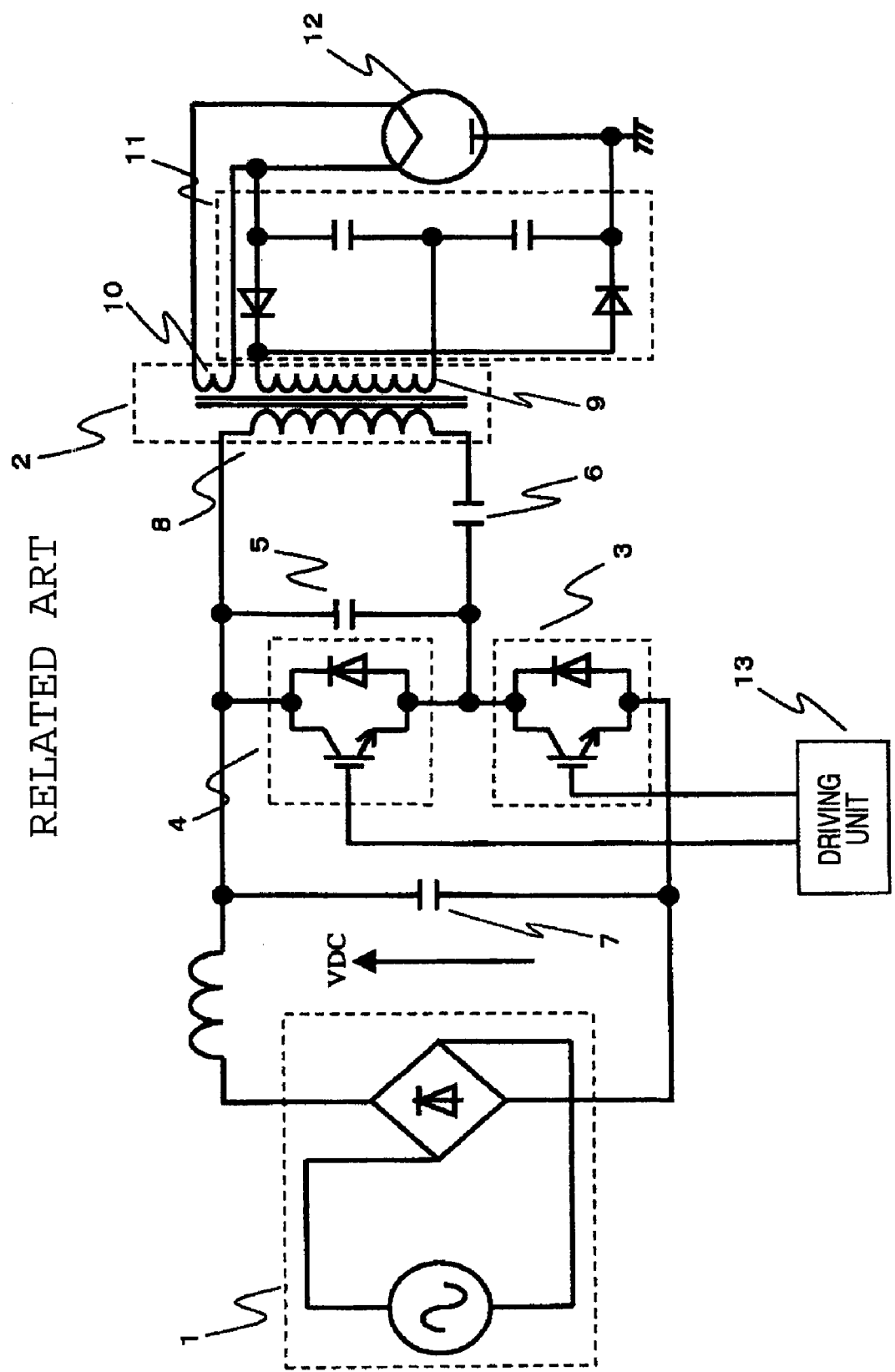
FIG. 9 is a diagram illustrating a circuit configuration of the known magnetron-driving high frequency heating apparatus.
Figure 10:
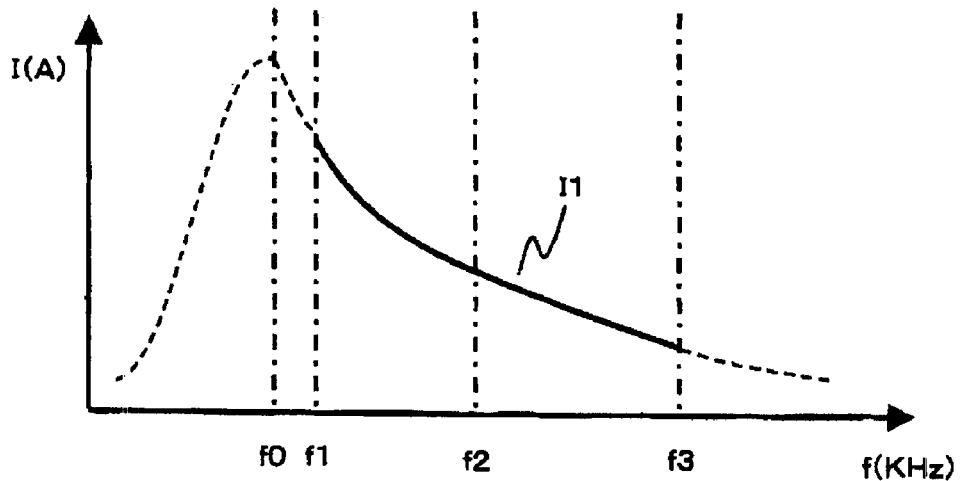
FIG. 10 is a graph illustrating a property of current and a working frequency at the time of applying a predetermined voltage to an inverter resonant circuit.
Figure 11:
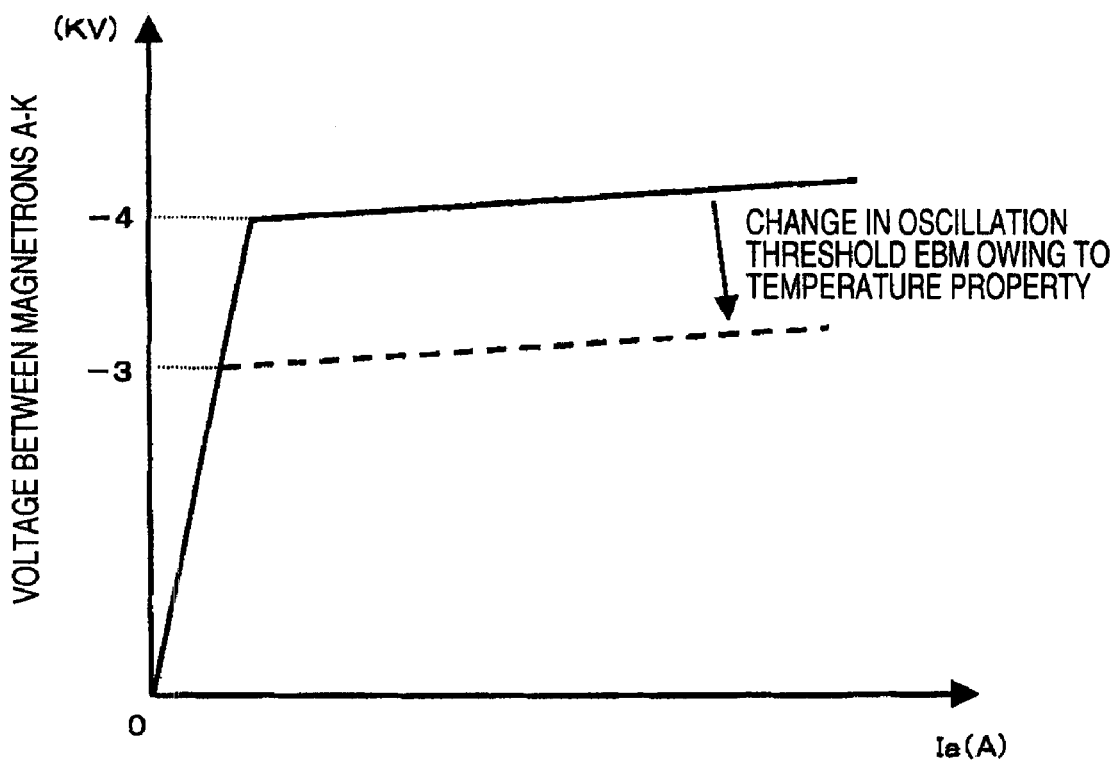
FIG. 11 is a diagram illustrating a property of a relationship between an oscillation threshold ebm and Ia in accordance with a change in temperature.

FIG. 1 is a diagram illustrating a circuit configuration for driving a magnetron according to a first embodiment of the invention. A direct current power supply 1, a leakage transformer 2, a first semiconductor switching element 3, a second semiconductor switching element 4, a first capacitor 5, a second capacitor 6, a third capacitor 7, a driving control IC unit 14, a full-wave voltage doubler rectification circuit 11, and a magnetron 12 constitute the overall circuit. The description of the overall circuit configuration will be omitted since it is the same as that shown in FIG. 9.

In the driving control IC unit 14 for driving the semiconductor switching elements 3 and 4, a frequency modulation-forming circuit 15 forms a frequency modulation waveform using a resistance divided waveform on the basis of the voltage of a commercial power supply. The frequency modulation-forming circuit 15 performs a feedback control receiving signals from an input fixing control circuit 19 as well so as to obtain the desired input (200 or 600 watts) described above. In this case, by giving a bias to the shape of the frequency modulation waveform while adding information about the power supply voltage through an ebm-tracking bias circuit 20, the fixation of an input current and tracking of an ebm decrease will be performed. Finally, with a driving of the semiconductor switching elements 3 and 4, an oscillation circuit 16 determines a practical operating frequency on the basis of the signals obtained from the frequency modulation-forming circuit 15, and a dead time-forming circuit 17 determines a desired dead time. Sequentially, a square wave formed by the switching device-driving circuit 18 is transmitted to the gates of the first semiconductor switching element 3 and the second semiconductor switching element 4.

Figure 2:
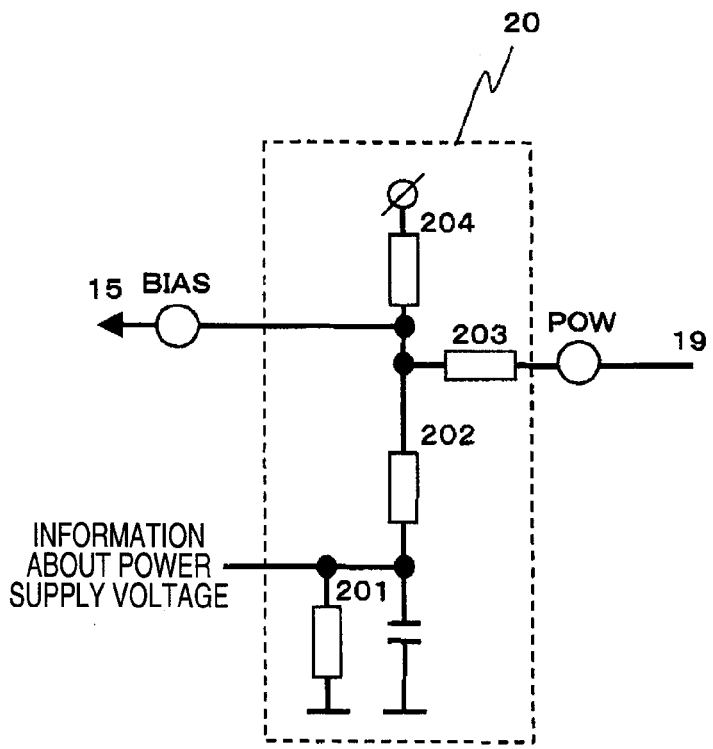
FIG. 2 is a diagram illustrating an ebm-tracking bias circuit according to a first embodiment of the invention.

FIG. 2 is a diagram illustrating the ebm-tracking bias circuit 20 in detail. A tracking level is determined by giving a weight to the accumulation information (POW) of an input current correction in accordance with the change in the oscillation threshold ebm obtained from the input fixing control circuit 19, and the information about the power supply voltage in a resistor network. In this case, the initial value of the accumulation information POW varies by an input, for example, 5.5 V by the input of 2000 W and 7.5 V by the input of 600 W, gradually increases due to the change in the oscillation threshold ebm caused by the change in the temperature of the magnetron, compared to the initial value. That is because an amount corrected in the input current fixing circuit becomes accumulated (Aspect 1).

Figure 3:
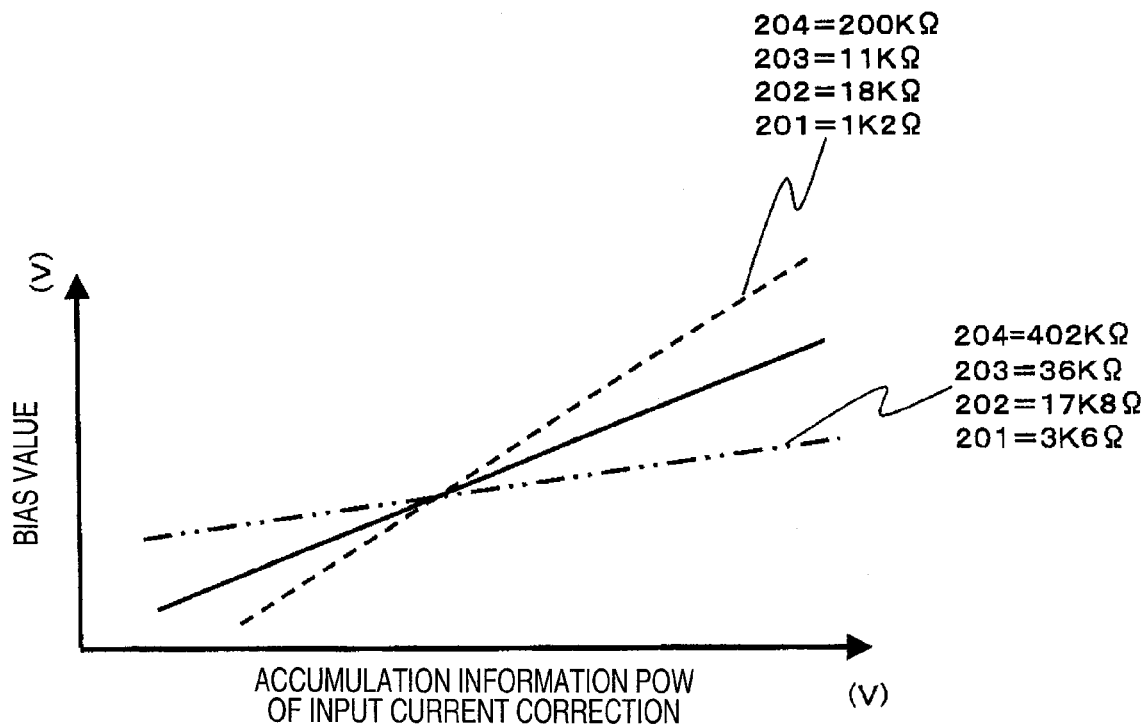
FIG. 3 is a graph illustrating a property of the accumulation information of an input current correction POW and a bias value according to the first embodiment of the invention.
Figure 4:
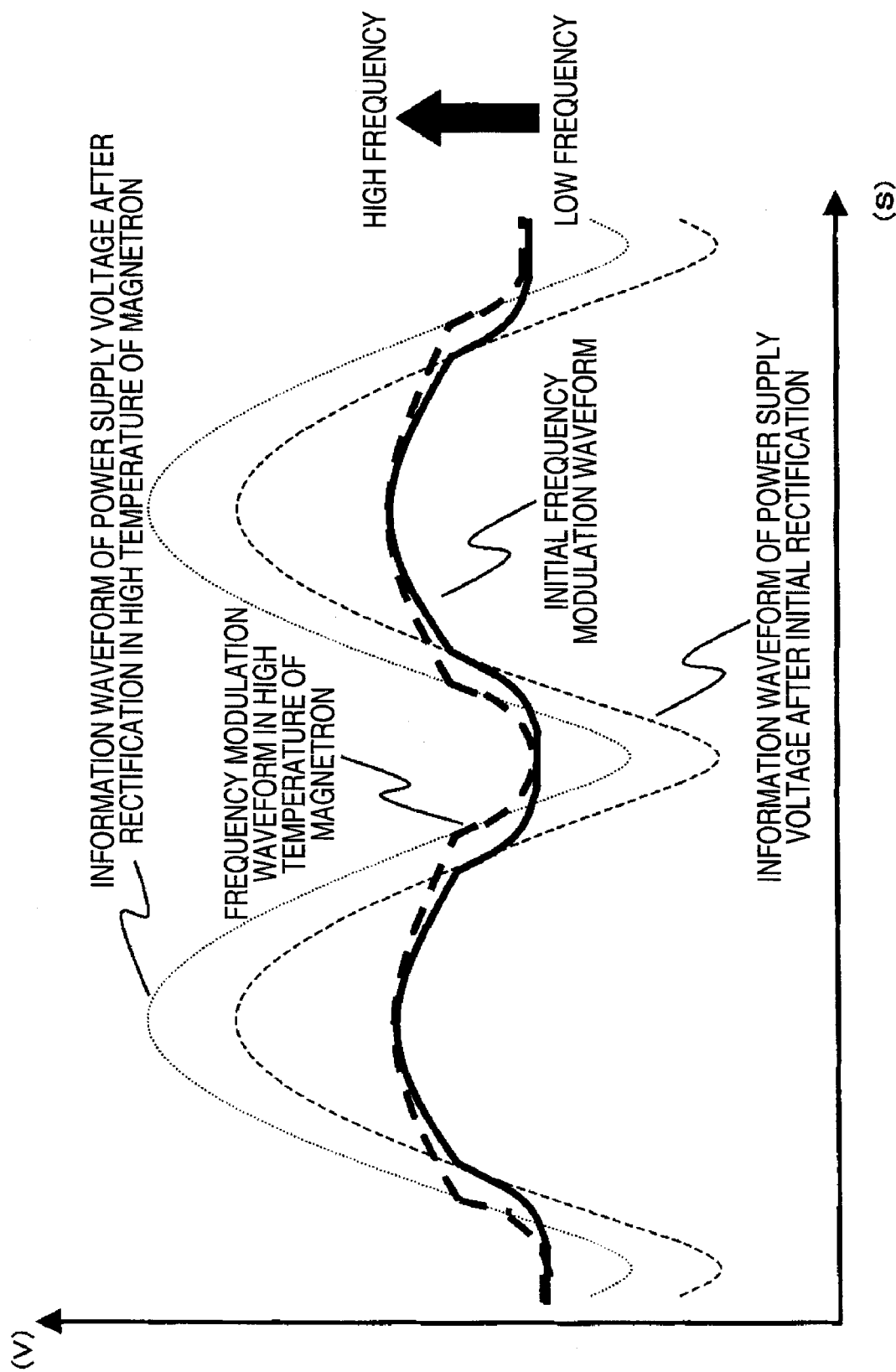
FIG. 4 is a graph illustrating a variation of a frequency modulation waveform according to the first embodiment of the invention.

In addition, FIG. 3 shows a degree of the variation amount of a bias value BIAS given to the frequency modulation-forming circuit 15 with respect to the variation amount of the accumulation information POW of the input current correction by configuring the resistor network. That is, the drawing shows the variation amount with respect to the variation in the oscillation threshold ebm, and the inclination of the property graph shown in FIG. 3 represents the tracking degree of the ebm variation. The tracking degree of the ebm variation can be easily adjusted by configuring the resistor network 201 to 204, and the shape of the frequency modulation waveform varies to the obtained bias value, that is, is controlled in the direction that the operating frequency of the portion in which the bias is added increases. FIG. 4 shows the variation in the frequency modulation waveform of the control in detail. The thick solid line represents the shape of the frequency modulation waveform at the time of the low temperature of the magnetron and thick dashed line represents the shape of the frequency modulation waveform at the time of the high temperature of the magnetron. That is, the bias is given to information waveform of the power supply voltage after rectification in order to uniformly maintain the input current and raise the inverter operating frequency owing to the decrease in the oscillation threshold ebm caused by the change in the temperature of the magnetron. In this manner, it is possible to prevent the extension of the harmonic component caused by the change in the input current waveform that takes place owing to the decrease in the oscillation threshold ebm, thereby meeting the harmonics performance of the power supply (Aspect 2).

In addition, when there are many the resistor network, a control agent parameter shown in FIG. 2, it is possible to add a weight to each resistor network that evaluates an optimal solution using a quality stability design method which is an improved method of the Taguchi Methods and an its own science solution method of our company, and thus prevent the harmonics of the power supply more rapidly. As a result, it is possible to easily determine the tracking degree of the change in the oscillation threshold ebm.

Second Embodiment

Figure 5:
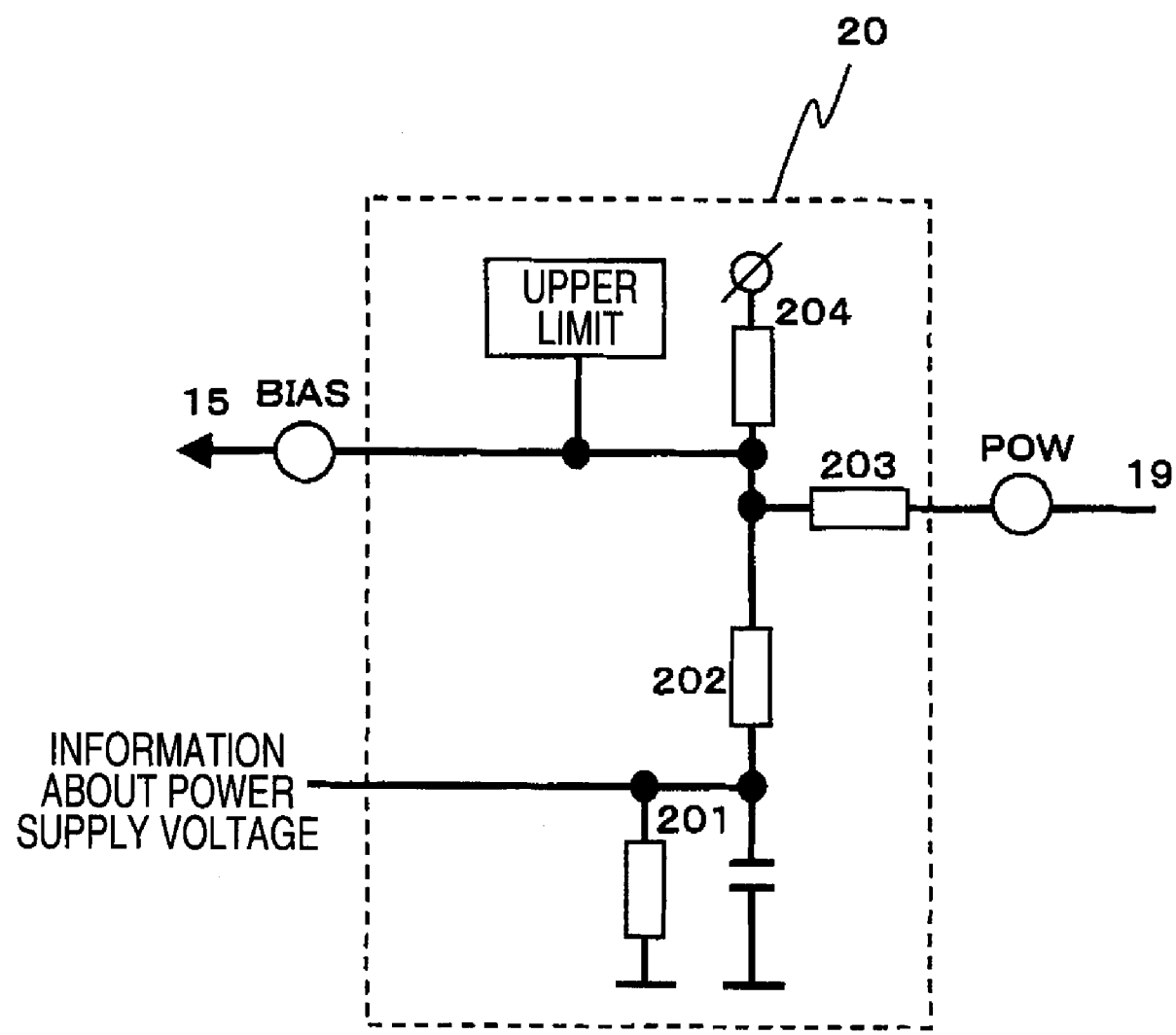
FIG. 5 is a diagram illustrating an ebm-tracking bias circuit according to a second embodiment of the invention.

As shown in FIG. 5, an upper limit is provided in the bias value given to the frequency modulation waveform in addition to the method according to the first embodiment. The frequency modulation waveform ascends owing to the given bias value as shown in FIG. 4. In this case, suppose that the temperature of the magnetron rises at in an abnormal voltage of +20% or +30% in the rating (+) side, or in a low output power (for example, the input of 600 W). In order to make the input current fixed, the bias value may ascend endlessly. In this case, the inverter operating frequency is in the ascending direction, and because of the limit of a switching speed, a destruction caused by a switching error may take place. In order to prevent the above-mentioned problem, the upper limit of the bias value can be provided. In this manner, the inverter operating frequency can be limited at the time of the abnormal voltage of the rating (+) side, thereby solving the destruction caused by the switching error (Aspect 3).

Third Embodiment

Figure 6:
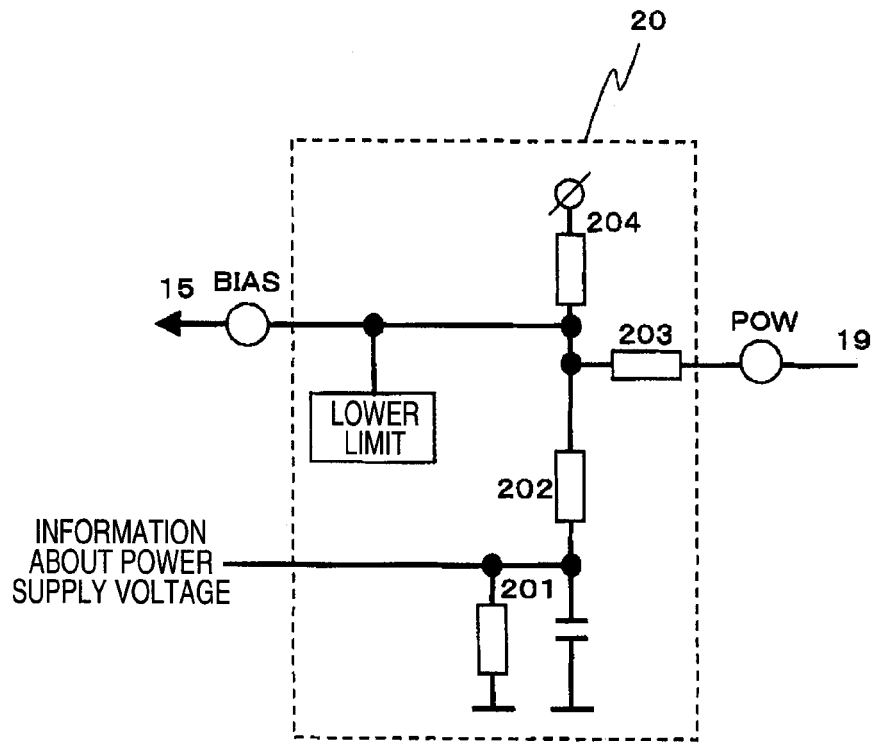
FIG. 6 is a diagram illustrating an ebm-tracking bias circuit according to a third embodiment of the invention.

As shown in FIG. 6, a lower limit is provided in the bias value given to the frequency modulation waveform in addition to the method according to the first embodiment. When the frequency modulation waveform shown in FIG. 4 comes down, the overall inverter operating frequency is lowered, and thus it is possible to obtain a high output power. In this case, when the voltage of the rating (−) side descends, the inverter operating frequency cannot help descending in order to obtain the high output power. In practice, since there is a human audible area in the inverter operating frequency, the lower limit is considered to be 18 KHz. In addition, as the lowest frequency limit, a lower limit is independently provided in the frequency modulation waveform. However, when there is no lower limit in the bias, the inverter operating frequency is fixed in the end at the time of lowering the voltage. As a result, the frequency modulation in accordance with the SIN wave of the commercial power supply cannot be obtained and the input current including many harmonic components may occur. In view of cooling the inverter parts, the cooling performance at the time of the abnormal voltage of the rating −20% or −30% is degraded, whereas a thermal destruction may take place at the time of the high output power. In order to solve the above-mentioned problems, the lower limit can be provided in the bias value and the extension of the input current can be prevented at the time of abnormal voltage of the rating (−) side, and thus the extension of the harmonic component and thermal destruction have been prevented (Aspect 4).

Fourth Embodiment

Figure 7:
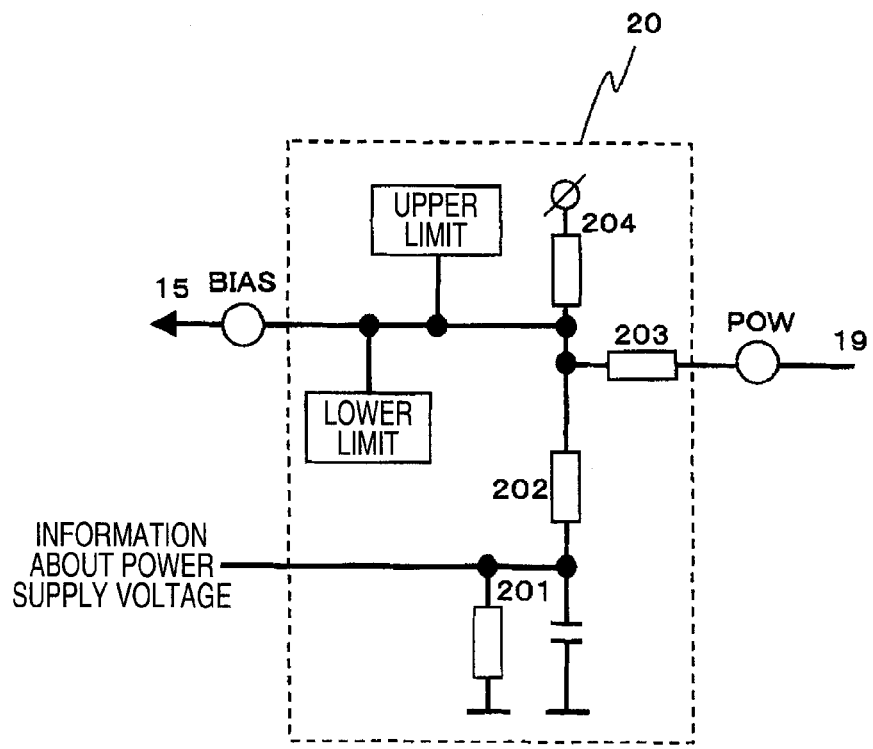
FIG. 7 is a diagram illustrating an ebm-tracking bias circuit according to a fourth embodiment of the invention.
Figure 8:
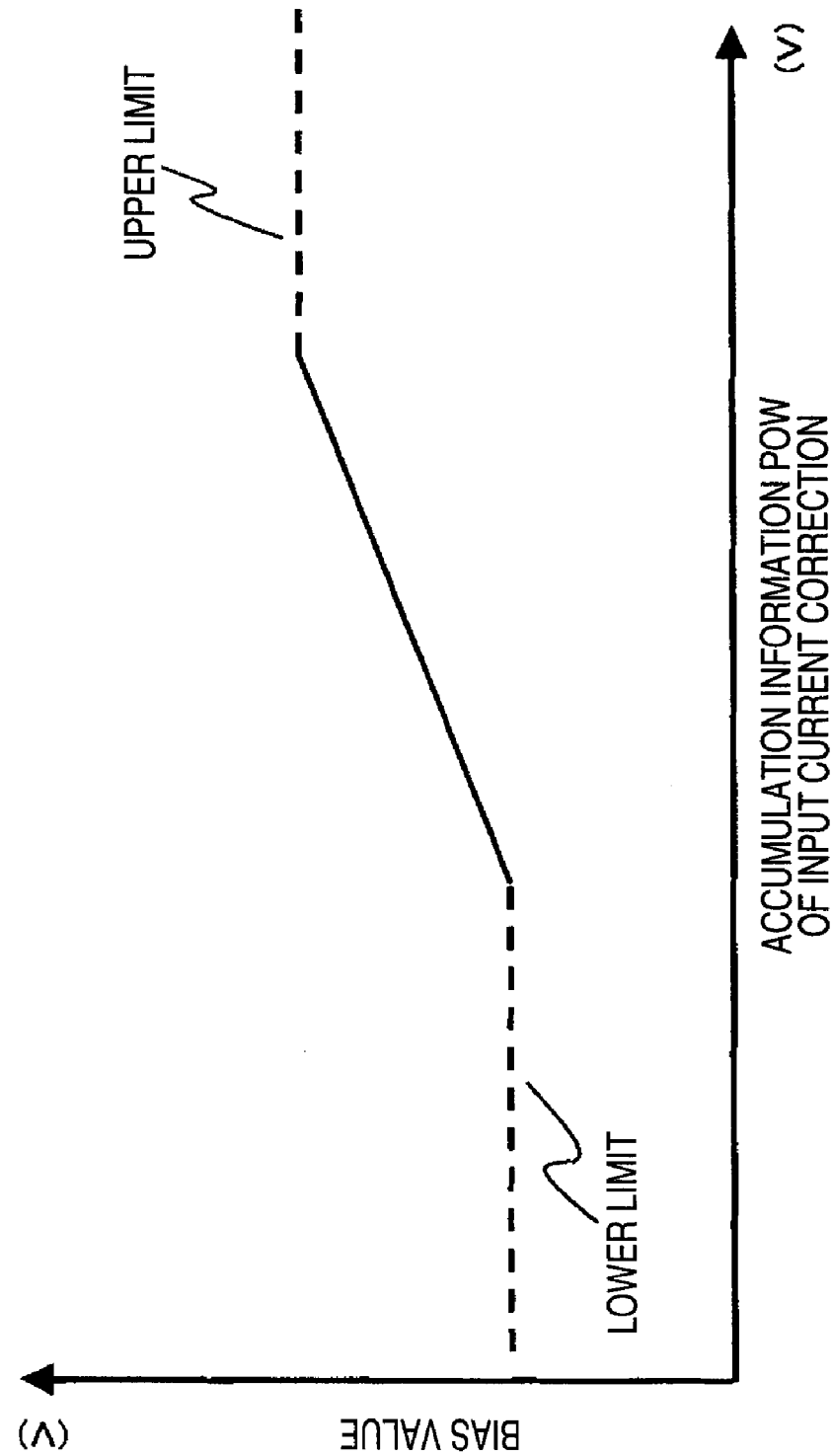
FIG. 8 is a graph illustrating the property of the accumulation information of the input current correction POW and the bias value according to the fourth embodiment of the invention.

FIG. 7 shows a combined method both according to the second and third embodiments. By providing the upper limit and the lower limit in the bias value, it is possible to solve all the concerned problems at the time when the power supply voltage is abnormally changed from the rating to (+) side or (−) side (Aspect 5). FIG. 8 is a graph illustrating a property of POW and the bias value according to the fourth embodiment. Even the power supply voltage is abnormally changed to the (+) side or (−) side, and thus even when the configuration POW is changed, the bias value varies in the range of the upper limit and the lower limit so as to be stable.

The invention has been described in detail with reference to the specific embodiments, but may be modified in various forms without departing from the gist of the invention by a person skilled in the related art.

The application is based on Japanese Patent Application No. 2004-304095 filed on Oct. 19, 2004, which is incorporated by reference.

INDUSTRIAL APPLICABILITY

According to a high frequency heating apparatus of the invention, since a feedback control of performing frequency modulation control so as to optically track the change in an oscillation threshold ebm caused by the change in the temperature of a magnetron, the degree of margin for a standard value can be increased whereas a harmonic component can be prevented.

The invention claimed is:

1. A high frequency heating apparatus which drives a magnetron (12) by allowing a semiconductor switching element (3,4) to perform a high frequency switching operation using a commercial power supply (1), said high frequency heating apparatus comprising:
    input fixing control means (19) for providing accumulation information based on a variation amount of a current of said commercial power supply (1) and a reference signal (Ref);
    ebm-tracking bias means (20) for providing an bias value on the basis of the voltage of said commercial power supply (1) and said accumulation information;
    frequency modulation means (15) for providing a frequency modulation waveform on the basis of the voltage of said commercial power supply (1), said frequency modulation waveform being given a bias in accordance with said bias value;
    driving unit (16,17,18) for providing driving signals which drives said semiconductor switching element on the basis of the signal output from said frequency modulation means (15),
    wherein said ebm tracking bias means (20) performs a feedback control by controlling said bias value in accordance with a variation of an oscillation threshold ebm caused by a change in a temperature of said magnetron (12).

2. The high frequency heating apparatus according to claim 1, wherein an upper limit is provided in the bias.

3. The high frequency heating apparatus according to claim 1, wherein a lower limit is provided in the bias.

4. The high frequency heating apparatus according to claim 1, wherein an upper limit and a lower limit are provided in the bias.

* * * * *